United States Patent
Georgi et al.

(10) Patent No.: US 7,893,398 B2
(45) Date of Patent: Feb. 22, 2011

(54) COMPENSATED MINERALOGY TOOL AND PROCESSING

(75) Inventors: Daniel T. Georgi, Houston, TX (US); Alfred I. Khisamutdinov, Novosibirsk oblast (RU); W. Allen Gilchrist, Jr., Houston, TX (US); Richard R. Pemper, Sugar Lane, TX (US)

(73) Assignee: Baker Hughes Incorporated, Houston, TX (US)

( * ) Notice: Subject to any disclaimer, the term of this patent is extended or adjusted under 35 U.S.C. 154(b) by 152 days.

(21) Appl. No.: 12/184,762

(22) Filed: Aug. 1, 2008

(65) Prior Publication Data

US 2010/0025574 A1    Feb. 4, 2010

(51) Int. Cl.
*G01V 5/08* (2006.01)
(52) U.S. Cl. ..................................... 250/265
(58) Field of Classification Search ................. 250/268, 250/269.1–269.8, 265
See application file for complete search history.

(56) References Cited

U.S. PATENT DOCUMENTS

| | | | | |
|---|---|---|---|---|
| 2,522,522 | A * | 9/1950 | Krasnow | 250/267 |
| 3,665,195 | A * | 5/1972 | Youmans | 250/269.7 |
| 3,940,610 | A * | 2/1976 | Dennis et al. | 250/253 |
| 4,180,727 | A * | 12/1979 | Givens | 250/264 |
| 4,439,676 | A | 3/1984 | Smith, Jr. et al. | |
| 4,542,292 | A | 9/1985 | Ellis | |
| 4,585,939 | A * | 4/1986 | Arnold et al. | 250/256 |
| 4,717,825 | A | 1/1988 | Smith, Jr. et al. | |
| 4,825,071 | A | 4/1989 | Gadeken et al. | |
| 4,939,361 | A | 7/1990 | Smith, Jr. et al. | |
| 5,120,955 | A | 6/1992 | Galford | |
| 5,408,097 | A * | 4/1995 | Wraight et al. | 250/256 |
| 6,285,026 | B1 * | 9/2001 | Evans et al. | 250/269.4 |
| 6,289,283 | B1 | 9/2001 | Plasek | |
| 7,512,034 | B2 * | 3/2009 | Haldorsen | 367/57 |
| 2006/0033022 | A1 | 2/2006 | Madigan et al. | |
| 2006/0033023 | A1 | 2/2006 | Pemper et al. | |

OTHER PUBLICATIONS

A. I. Khisamutdinov et al., Neutron Activation Logging of Oxygen, Silicon and Aluminum and Reconstruction of the Fluid Type in Quartzfeldspar Reservoir Rocks, Institute of Mathematics, Siberian Department, USSR Academy of Sciences, Novosibirsk , (Presented by Academician M.M. Lavrent'yev, Aug. 25, 1988), pp. 30-33.

B. Roscoe et al., Non-Conventional Applications of Through-Tubbing Carbon Oxygen Logging Tools, SPWLA 36th Annual Logging Symposium, Jun. 26-29, 1995, pp. 1-12.

(Continued)

*Primary Examiner*—David P Porta
*Assistant Examiner*—Kiho Kim
(74) *Attorney, Agent, or Firm*—Cantor Colburn LLP

(57) ABSTRACT

A method for estimating information about a formation, the method including obtaining a first set of radiation data substantially influenced by the formation and non-formation materials; obtaining a second set of radiation data substantially influenced by the non-formation materials; and correcting the first set of radiation data with the second set of radiation data to provide corrected formation radiation data.

19 Claims, 6 Drawing Sheets

OTHER PUBLICATIONS

B.A. Roscoe et al., A New Through-Tubing Oil Saturation Measurement System, SPE 21413, 1991 SPE Middle East Oil Show held in Bahrain Nov. 16-19, pp. 659-668.

A.I. Khisamutdinov et al., Numerical Method of Evaluating Elemental Content of Oil-Water Saturated Formations Based on Pulsed Neutron-Gamma Inelastic Log Data, SPE-104342, SPE Russian Oil and Gas Technical Conferenceand Exhibition in Moscow, Russia Oct. 3-6, 2006; pp. 3.

J.L. Alixant et al., Special Gamma Ray Measurement on Cuttings: An Alternative to MWD, SPE/IADC 57550, 1999 Middle East Drilling Technology Conference, pp. 1-10.

R.J. North, Through -Casing Reservoir Evaluation Using Gamma Ray Spectroscopy, SPE 16356, California Regional Meeting, Ventura California Apr. 8-10, 1987, pp. 329-342.

J.E. Galford et al., Improving Pulsed Neutron Gamma Ray Spectroscopy Elemental Weight Percent Estimates Through Automatic Dimensioning of the Spectral Fitting Process, SPE 18151, 63rd Annual Technical Conference and Exhibition of the Society of Petroleum Engineers in Houston, Texas Oct. 2-5, 1988; pp. 16.

H.D. Smith et al., A Multi-Function Compensated Spectral Natural Gammay Ray Logging System, 58th Annual Technical Conference and Exhibition held in San Francisco Oct. 5-8, 1983; pp. 15.

Ed. L. Bigelow, "Introduction to Wireline Log Analysis". Western Atlas International, INc. 1992. pp. 216-218.

* cited by examiner

COMPENSATED MINERALOGY TOOL AND PROCESSING

BACKGROUND OF THE INVENTION

1. Field of the Invention

This invention relates to measuring gamma radiation from a subsurface formation. In particular, the measuring is performed within a borehole.

2. Description of the Related Art

Geologic formations below the surface of the earth may contain reservoirs of oil and gas. Measuring properties of the geologic formations provides information that can be useful for locating the reservoirs of oil and gas. Generally, the oil and gas are retrieved by drilling boreholes into the subsurface of the earth. The boreholes also provide access to take measurements of the geologic formations.

The geologic formations may include formation layers. In a quest for oil and gas, it is important to know about the location and composition of the formation layers. In particular, it is important to know about the formation layers with a high degree of accuracy so that drilling resources are not wasted.

Well logging is a technique used to take measurements of the geologic formations from the boreholes. In one embodiment, a "logging instrument" is lowered on the end of a wireline into the borehole. The logging instrument sends data via the wireline to the surface for recording.

Measuring naturally occurring gamma radiation (or gamma rays) is one way to determine characteristics of the formation layers. A gamma radiation detector may be used as a component of the logging instrument to measure the gamma radiation. In typical embodiments, a scintillator material and a photomultiplier are used for gamma radiation detection. A gamma ray entering the gamma radiation detector will cause an output of an electrical signal. The output may be referred to as a "count." The magnitude of the electrical signal is generally related to the energy of the gamma ray detected.

Gamma rays may be emitted from the formation layers and from borehole materials such as mud. In particular, the mud may contain gamma radiation emitters such as clay and potassium. As the gamma radiation detector moves along the borehole, gamma rays from all sources may enter the gamma radiation detector and be detected. In addition, the gamma radiation detector may detect an energy level of each gamma ray entering the detector. The gamma ray energy levels may be used to create gamma ray energy spectra. The gamma ray energy spectra reflect types and quantities of elements (referred to as elemental yield) in the formation layers and the borehole materials.

The borehole generally contains a drilling mud or in the case of a producing well some mixture of hydrocarbons and water. Unfortunately, an exact elemental make up of the fluids in the borehole, and in particular the drilling mud, is neither constant nor well known. The drilling mud contents are determined to a large degree by a mud company. Generally, ingredients of the drilling mud are trade secrets that are not available to a well owner or a service company logging a well. In addition as the well is drilled, the drilling mud is contaminated by drill solids. The drilling solids are a mixture of rocks that have been drilled through. As the drilling mud is circulated and the drill solids are partially removed at the surface, mineralogy and lithology and, hence, elemental composition is not sufficiently known to completely correct the gamma ray energy spectra or computed elemental yields. Further, even if an elemental composition of the borehole materials is known, the cross-sectional area of the borehole is not constant. Hence, correction to the gamma ray energy spectra and, therefore, the computed elemental yields also depends on the borehole caliper and a position of the logging instrument in the borehole.

Accuracy of determinations of the mineralogy and lithology of the formation layers depends on the accuracy of data used to determine the type and quantity of elements in the formation layers. In general for oil and gas exploration purposes, interest lies in the type and quantity of the elements in the formation layers. In that gamma radiation may be emitted from the borehole materials in addition to the formation layers, it is critical to correctly partition elemental yields between the borehole materials and the formation layers.

The drilling mud in the borehole can also influence gamma radiation detection by absorption of the gamma radiation emitted by the formation layers. Generally, the gamma radiation absorption is accounted for by correction procedures, charts, mud density measurements, and borehole diameter (caliper) measurements for centralized and decentralized logging instruments.

An instrument suitable for measuring gamma radiation is a SPECTRALOG logging instrument, commercially available from Baker Hughes Incorporated of Houston, Tex. The SPECTRALOG logging instrument provides elemental concentration data for uranium, thorium, and potassium.

Another method of measuring characteristics of the formation layers using measurements of gamma radiation is referred to as "pulsed neutron spectroscopy." The pulsed neutron spectroscopy method uses neutron activation of nuclei in elements of the formation layers. A FLEX logging instrument, commercially available from Baker Hughes Incorporated, uses pulsed neutron spectroscopy. In general, a pulse of neutrons is used to activate the nuclei. The neutrons interact with the nuclei, which may emit characteristic gamma rays through one of three processes, inelastic neutron scattering, fast-neutron reactions or neutron capture. The gamma rays from the inelastic and fast-neutron interactions occur during, or very soon after, the pulse of neutrons. The gamma rays resulting from the capture events occur later. As above, the gamma rays are detected with the gamma radiation detectors. The gamma rays resulting from fast interactions are used to create inelastic gamma ray energy spectra while the gamma rays occurring later create capture gamma ray energy spectra. Data from the two types of gamma ray energy spectra are used to deduce the elemental yields. The data are corrected to account for the inelastic and fast-neutron interactions and the neutron capture in the borehole materials. For the reasons discussed above concerning variations and unknowns of the drilling mud, accuracy of corrections applied to the data may not be known.

What are needed are an apparatus and a method for making measurements of gamma radiation of a subsurface formation from a borehole. In particular, the apparatus and method are needed to compensate for gamma radiation emitted from the borehole materials.

BRIEF SUMMARY OF THE INVENTION

The shortcomings of the prior art are overcome and additional advantages are provided through a method for estimating corrected formation radiation data, the method including obtaining a first set of radiation data substantially influenced by the formation and non-formation materials; obtaining a second set of radiation data substantially influenced by the non-formation materials; and correcting the first set of radiation data with the second set of radiation data to provide corrected formation radiation data.

Also disclosed is an instrument for evaluating a formation penetrated by a borehole, the instrument including a first set of at least one radiation detector sensitive to natural radiation from a first proportion of formation material and non-formation material; and a second set of at least one radiation detector sensitive to natural radiation from a second proportion of the formation material and the non-formation material.

Further disclosed is a computer program product stored on machine-readable media, the product including machine-executable instructions for estimating corrected formation radiation data, the product including instructions for obtaining a first set of radiation data substantially influenced by the formation and non-formation materials; obtaining a second set of radiation data substantially influenced by the non-formation materials; and; correcting the first set of radiation data with the second set of radiation data to provide corrected formation radiation data.

BRIEF DESCRIPTION OF THE DRAWINGS

Referring now to the drawings wherein like elements are numbered alike in the several Figures.

DETAILED DESCRIPTION OF THE INVENTION

Figure 1:
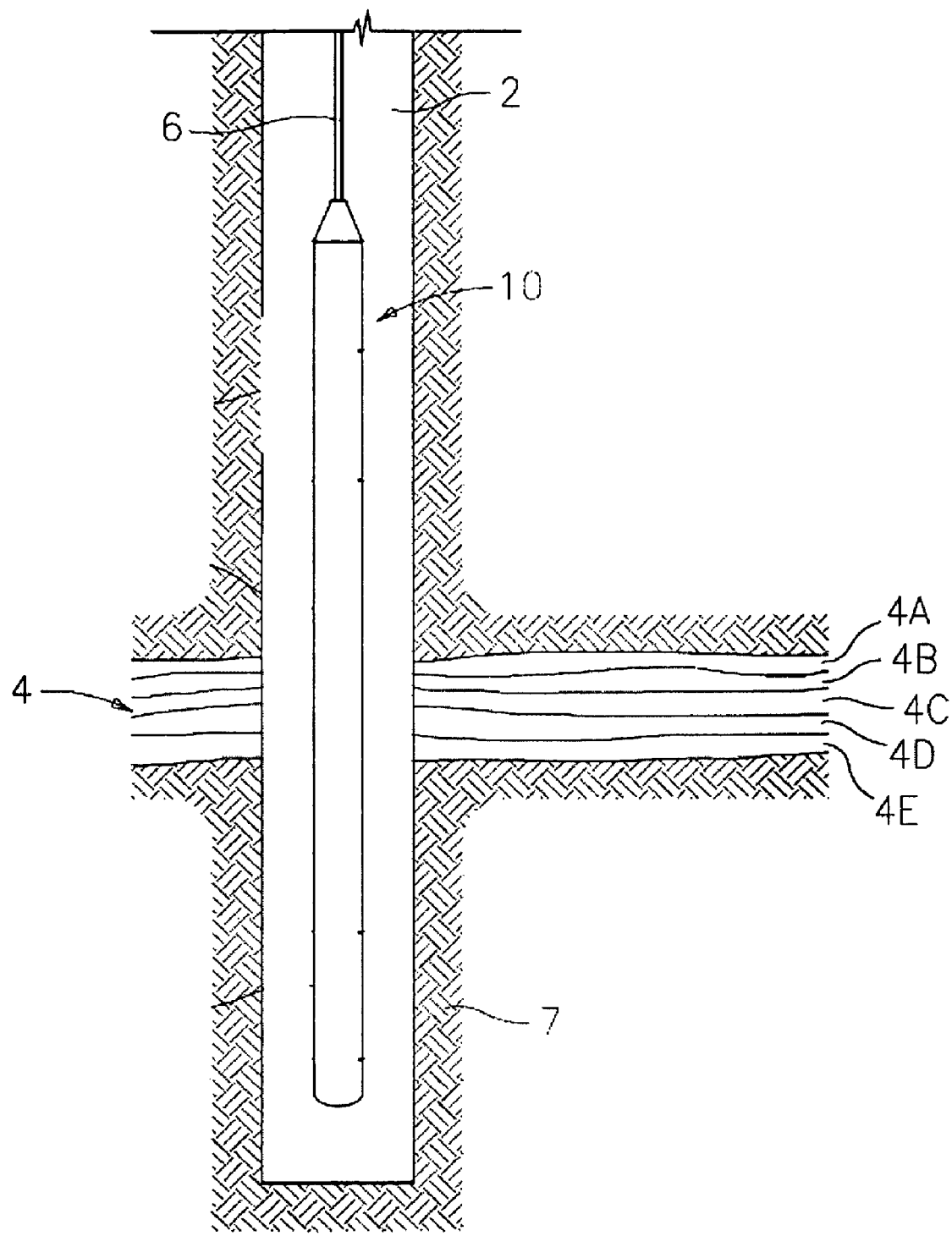
FIG. 1 illustrates an exemplary embodiment of a logging instrument in a borehole penetrating the earth.

Referring to FIG. 1, a well logging instrument 10 is shown disposed in a borehole 2. The borehole 2 is drilled through earth 7 and penetrates formations 4, which include various formation layers 4A-4E. The logging instrument 10 is typically lowered into and withdrawn from the borehole 2 by use of an armored electrical cable 6 or similar conveyance as is known in the art.

In typical embodiments, the borehole 2 includes materials such as would be found in oil exploration, including a mixture of liquids such as water, drilling fluid, mud, oil and formation fluids that are indigenous to the various formations. One skilled in the art will recognize that the various features as may be encountered in a subsurface environment may be referred to as "formations." Accordingly, it should be considered that while the term "formation" generally refers to geologic formations of interest, that the term "formations," as used herein, may, in some instances, include any geologic points of interest (such as a survey area). In the context of this specification, the term "formation" is not limited to geologic formations but may also include materials such as fluids, gases, liquids, and the like.

The teachings provide an apparatus and a method for making measurements of properties of the formation 4. The apparatus and method are used to measure gamma radiation emitted from the formation 4. In particular, the measurements are compensated for the gamma radiation emitted from materials in the borehole 2. The measurements are performed in the borehole 2. The gamma radiation may be emitted naturally from the materials or by neutron activation of the materials. The well logging instrument 10 includes a first gamma radiation detector. Generally, the first gamma radiation detector measures gamma radiation that includes contributions from radiation emitted from the borehole 2 and the formation 4. A second gamma radiation detector is used to measure gamma radiation in the volume that mostly includes the materials in the borehole 2. Generally, shielding prevents the second gamma radiation detector from measuring contributions of radiation from the formation 4. The first gamma radiation detector and the second gamma radiation detector each produce a gamma ray energy spectrum. The two gamma ray energy spectra are combined in such a way as to provide the gamma ray energy spectrum for essentially the formation 4. The properties of the formation 4 are determined from the gamma ray energy spectrum for the formation 4. Before the logging instrument 10 and methods are discussed in detail, certain definitions are provided.

The terms herein are to be construed in their traditional broad sense as known to those skilled in the art. The term "gamma radiation detector" relates to instruments that measure the gamma radiation entering the instrument. Generally, the gamma radiation detector uses a scintillator material to interact with the gamma radiation to create photons. The photons are generally detected by a photomultiplier. The term "focus" relates to a volume from which if gamma radiation is emitted in the direction of the gamma radiation detector, the gamma radiation will be detected by the gamma radiation detector. A gamma radiation detector focused on a volume will generally detect radiation emitted from the volume in the direction of the detector and not detect radiation emitted from materials outside the volume. The term "detector geometry" relates to a configuration of the gamma radiation detector. The detector geometry may include a size and shape of the scintillator material and the photomultiplier. The detector geometry of the gamma radiation detector may allow the detector to focus on a specified volume. The term "placement geometry" relates to a placement of the gamma radiation detector within the logging instrument 10. The placement geometry may allow the gamma radiation detector to focus on a specified volume. The term "logging while drilling" (LWD) relates to measuring parameters from the borehole 2 while drilling is taking place. The parameters may include geological parameters, borehole parameters and other parameters as appropriate in the art. The term "sonde" relates to a section of the well logging tool 10 that contains measurement sensors as opposed to the section that contains electronics and power supplies.

For the purposes of this discussion, it is assumed that the borehole 2 is vertical and that the formations 4 are horizontal. The apparatus and method, however, can be applied equally well in deviated or horizontal wells or with the formation layers 4A-4E at any arbitrary angle. The apparatus and method are equally suited for use in LWD applications and in open-borehole and cased-borehole wireline applications. In LWD applications, the apparatus may be disposed in a drilling collar. Additionally, the logging instrument 10 and method can be applied to total gamma radiation measurements and to measurements of gamma ray energy spectra.

Figure 2:
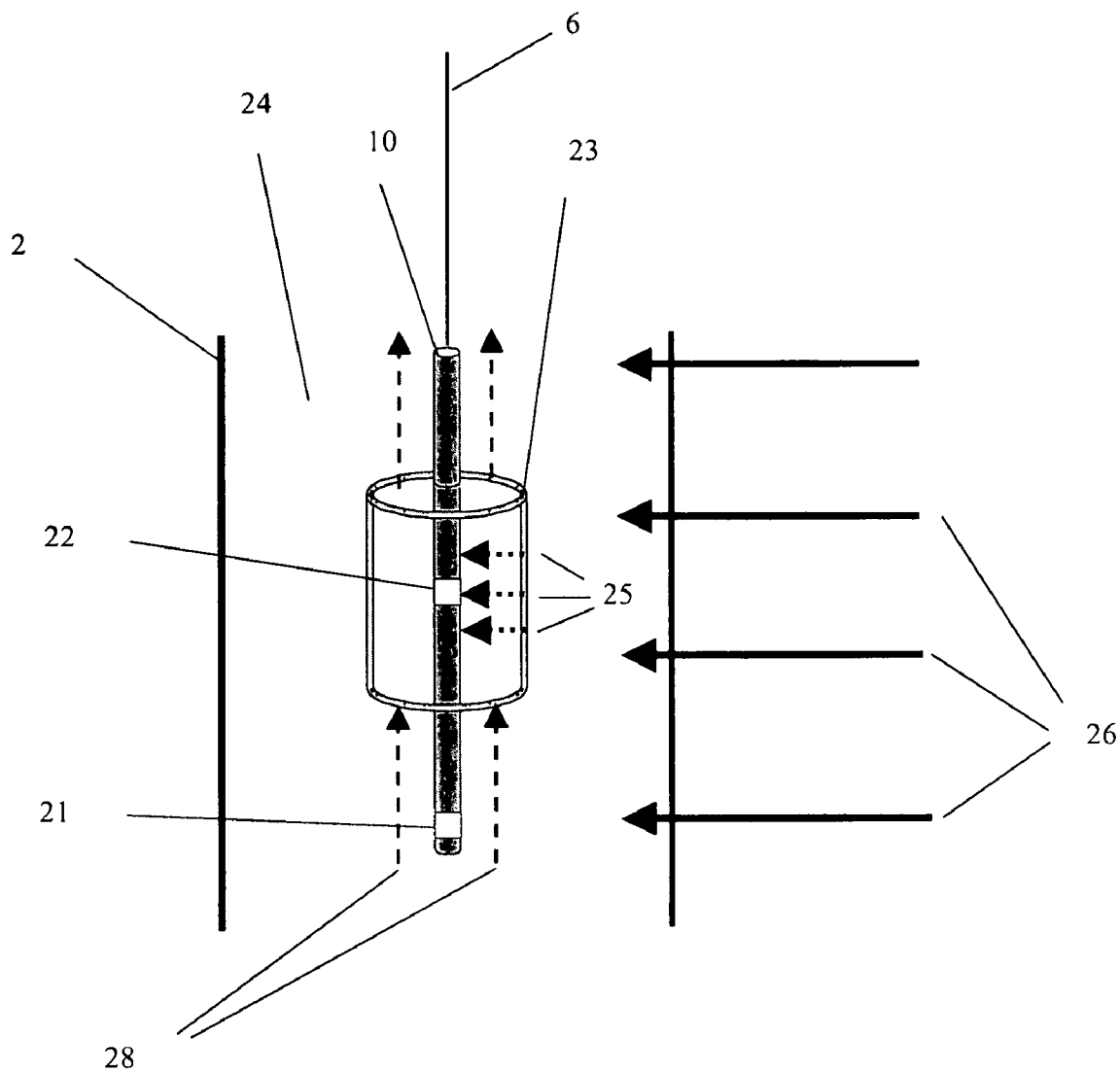
FIG. 2 illustrates an exemplary embodiment of the logging instrument with two gamma radiation detectors.

FIG. 2 illustrates an exemplary embodiment of the well logging instrument 10. The instrument 10 includes a first gamma radiation detector 21 (referred to as detector 21). The detector 21 measures gamma radiation emitted from the formation 4 and the borehole 2. Generally, the detector 21 is not shielded. The instrument 10 also includes a second gamma radiation detector 22 (referred to as detector 22). The detector 22 essentially measures gamma radiation emitted from materials in the borehole 2. Generally, the detector 22 is shielded by shielding 23. The shielding 23 provides for focusing the detector 22 essentially on borehole materials 24 such as drilling mud and cuttings in the borehole 2. In general, the shielding 23 has a hollow cylindrical shape with the detector 22 in the center. The shielding 23 provides for shielding the detector 22 essentially from gamma radiation emitted by materials exterior to the shielding 23.

The shielding 23 is designed so that the borehole materials 24 enter the interior of the shielding 23 as the instrument 10 traverses the borehole 2. Consequently, the borehole materials 24 in the interior of the shielding 23 may be continuously displaced as the instrument 10 traverses the borehole 2. The borehole materials 24 flow through the interior of the shielding 23 as the instrument 10 is lowered or raised in the borehole. Referring to FIG. 2, direction arrows 28 depict the flow of the borehole materials 24 through the shielding 23 as the instrument 10 is lowered in the borehole 2. In this manner, the second gamma radiation detector 22 can measure gamma ray energy spectra from a representative sample of the borehole materials 24 surrounding the instrument 10. FIG. 2 also illustrates an example of borehole gamma radiation 25 emitted from the borehole materials 24. Similarly, FIG. 2 illustrates an example of formation gamma radiation 26 emitted from the formation 4.

Figure 3:
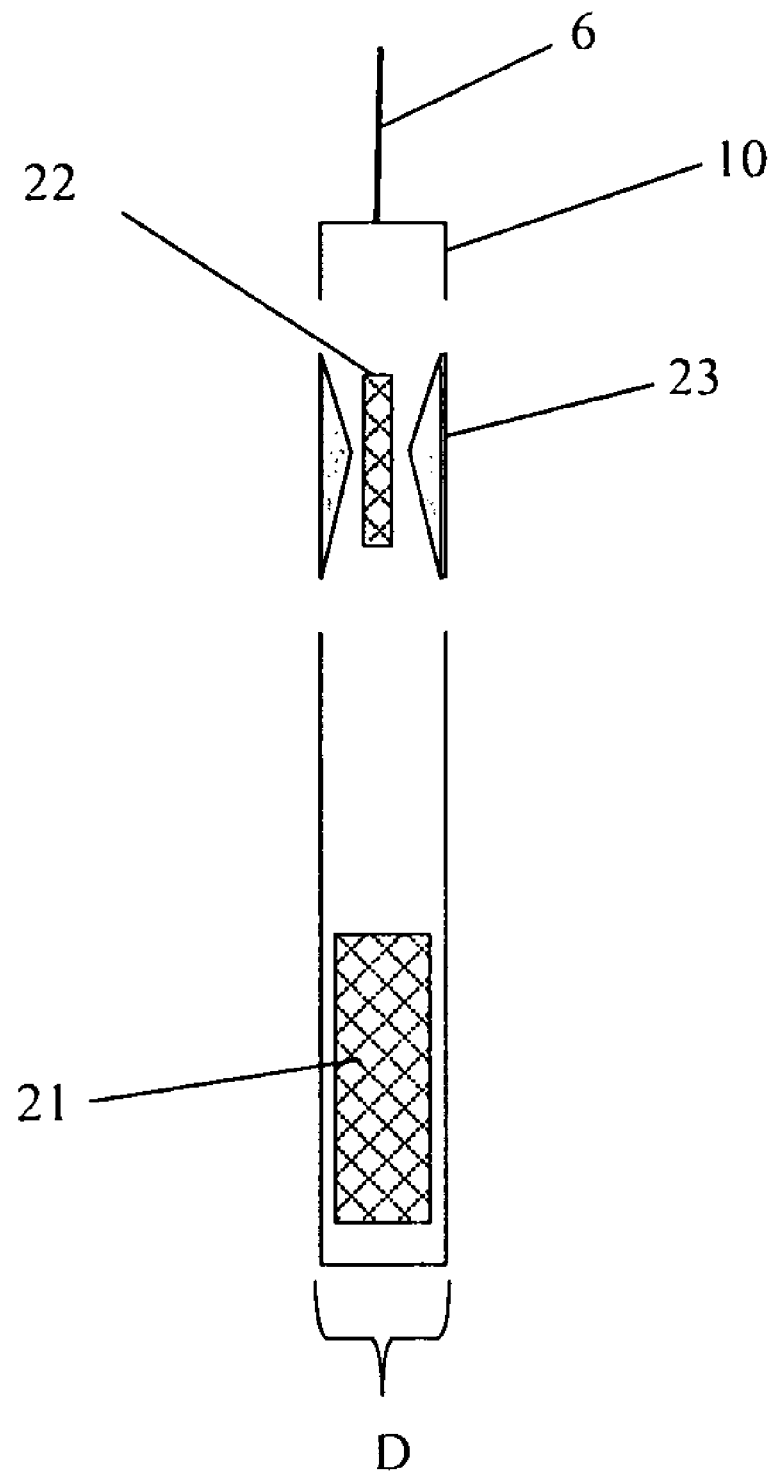
FIG. 3 illustrates another exemplary embodiment of the logging instrument with two gamma radiation detectors.

FIG. 3 illustrates another embodiment of the well logging instrument 10. In this embodiment, the first gamma radiation detector 21 is larger than the second gamma radiation detector 22. The larger size of the detector 21 provides for increasing count rates and facilitating high logging speeds. Referring to FIG. 3, the detector 22 is smaller than the detector 21 to allow for the shielding 23 to fit within the diameter "D" of the instrument 10. The smaller size of the detector 22 may reduce a count rate resulting in poorer counting statistics. However, the borehole materials 24 generally do not change rapidly through the borehole 2. Hence to improve the counting statistics, data may be accumulated from the second gamma radiation detector 22 over longer intervals of time than data collected from the first gamma radiation detector 21.

Figure 4:
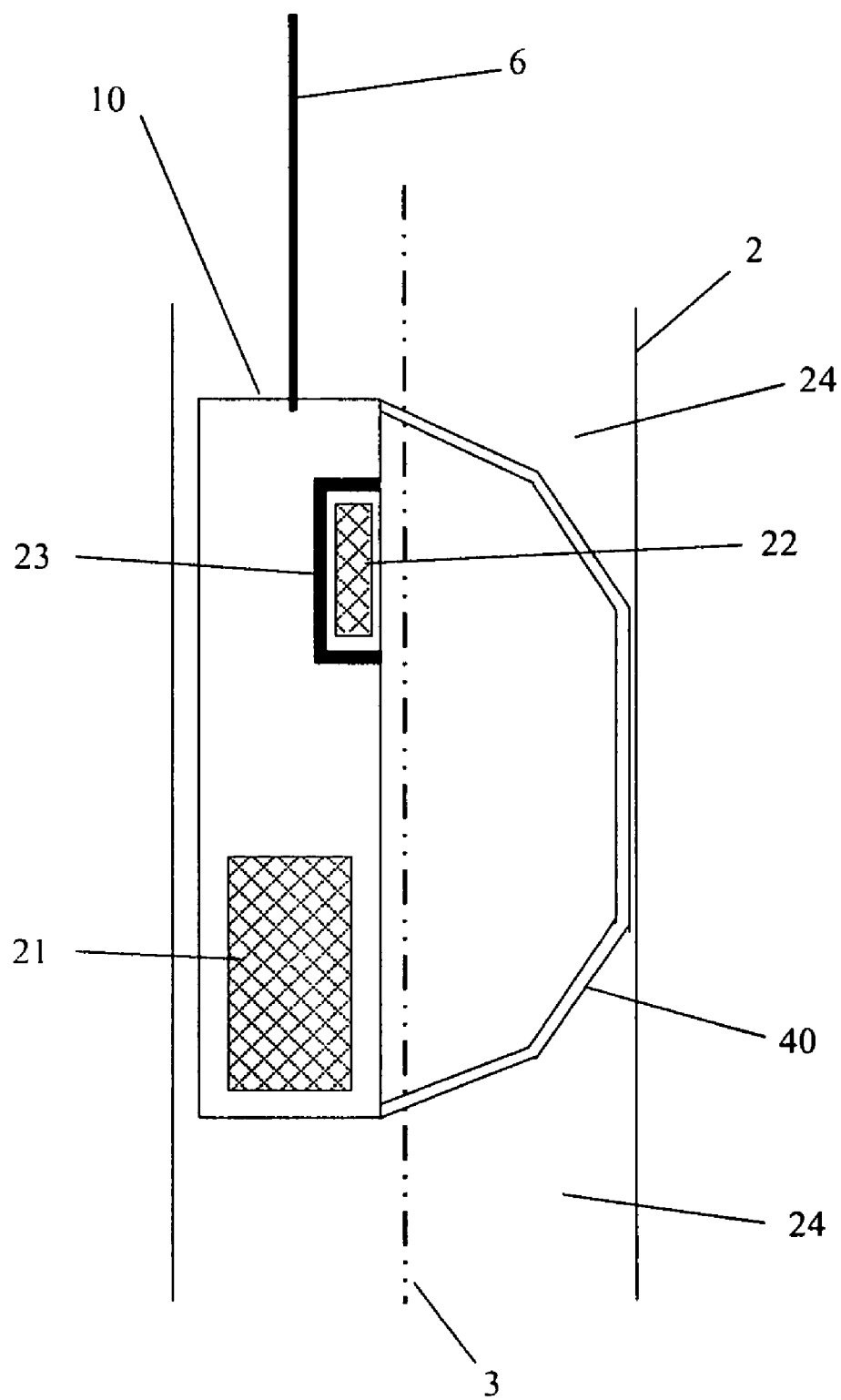
FIG. 4 illustrates an exemplary embodiment of the logging instrument with one detector mounted to one side of the logging instrument.

Other embodiments of the instrument 10 provide for focusing the second gamma radiation detector 22 on the borehole materials 24. In one embodiment referring to FIG. 4, the detector 22 is mounted to one side of the instrument 10. The instrument 10 may then be placed eccentric to a center axis 3 of the borehole 2 such that an unshielded part of the detector 22 faces the center of the borehole 2. Referring to FIG. 4, the instrument 10 includes a bow spring 40 for placing the instrument 10 eccentric to the center axis 3. The embodiment of FIG. 4 may include at least one of an active system and a passive system for orienting the instrument 10 so that the unshielded part of the detector 22 is oriented to the center of the borehole 2. In another embodiment, the detector 22 includes at least one of a detector geometry and a placement geometry optimized for measuring radiation from the borehole materials 24.

In some embodiments of the well logging instrument 10 using pulsed neutron spectroscopy, the second gamma radiation detector 22 is placed on a sonde where the detector 22 is not influenced by the pulse of neutrons. In these embodiments, the detector 22 generally includes a scintillator-photomultiplier tube combination adapted for placement within the instrument 10. Once it is determined how the borehole materials 24 affect the gamma ray energy spectra from the first gamma radiation detector 21, then the elemental yields such as for uranium, thorium, and potassium can be corrected.

Elemental yields of the formation 4 may be determined from the gamma ray energy spectrum for the formation 4. The gamma ray energy spectrum derived from radiation detected in the borehole 2 by the first gamma radiation detector 21 (referred to as a main spectrum) needs to be corrected with the gamma ray energy spectrum derived essentially from the borehole materials 24 (referred to as a background spectrum) to provide the gamma radiation spectrum for the formation 4. Generally, the main spectrum is obtained from total counts received by the first gamma radiation detector 21 over a period of time. Similarly, the background spectrum is received from total counts received by the second radiation detector 22 over a period of time. Each count is related to a gamma ray emitted by an isotope and detected by a gamma radiation detector. Each gamma ray has an energy level that can be detected as part of the process of detecting the count. In one embodiment, each count of the total counts detected is grouped by energy level or an energy interval (also called "window") into which the count falls. For example, total counts may be detected and measured between 0.3 and 3 MeV. A potassium series isotope may emit a 1.46 MeV natural gamma ray that will fall into an associated energy of window of 1.3 to 1.6 MeV. A uranium series nuclide ($Bi^{214}$) emits a natural gamma ray with energy of 1.76 MeV that falls within an associated energy window of 1.7 to 1.95 MeV. A thorium series nuclide (thallium$^{208}$) emits a natural gamma ray with energy 2.62 MeV that falls within an associated energy window of 2.4 to 2.85 MeV.

There are at least three techniques for correcting the main spectrum. A first technique subtracts the background spectrum from the main spectrum. Obtaining good statistics in the data usually takes a period of time for both spectrums to develop before the background spectrum can be subtracted from the main detector spectrum. Alternatively, a second technique separates elemental spectra such as for uranium, thorium, and potassium from the background spectrum (to produce elemental background spectra) and from the main spectrum (to produce elemental main spectra). The elemental background spectra are then individually subtracted from the elemental main detector spectra. Finally, a third technique solves for the elemental yield derived from gamma ray energy data from the detector 21 and the elemental yield derived from the gamma ray energy data from the detector 22 simultaneously.

The third technique is referred to as joint inversion. The elemental yields are determined from a joint inversion of the gamma ray energy data from the detector 21 and the gamma ray energy data from the detector 22. The joint inversion technique is based on the Superposition Principle applied to particle transport processes. If $d_1$ represents a column of counts from the first gamma radiation detector 21 and $d_2$ represents a column of counts from the second gamma radiation detector 22, then $$d_1 = A_{11}\rho_1 + A_{12}\rho_2 \quad (1)$$

$$d_2 = A_{21}\rho_1 + A_{22}\rho_2 \quad (2)$$

where $\rho_1$ represents concentrations of elements of the formation 4 generating gamma radiation, $\rho_2$ represents concentrations of elements of the borehole materials 24 generating gamma radiation, and $A_{11}, A_{12}, A_{21}$, and $A_{22}$ are matrixes. Analytic expressions of these matrixes can be written in terms of Transport Theory. The concentrations of some elements within the formation 4 and the borehole materials 24 may be given or known. Therefore, contributions to the counts from these elements, denoted as $I_1^{(0)}$ for contributions measured by the detector 21 and $I_2^{(0)}$ for other contributions measured the detector 22, may be separated from equations (1) and (2). Equations (1) and (2) may be rewritten as $$d_1 = I_1^{(0)} + A_{11}\rho'_1 + A_{12}\rho'_2 \quad (3)$$

$$d_2 = I_2^{(0)} + A_{21}\rho'_1 + A_{22}\rho'_2 \quad (4)$$

where $\rho'_1$ and $\rho'_2$ represent unknown concentrations of elements generating gamma radiation from the formation 4 and the borehole materials 24 respectively. Equations (3) and (4) plus constraint equations are written in such a way that the equations are solvable with respect to the unknowns $\rho'_1$ and $\rho'_2$. One method of solving the equations uses an iteration procedure. If the equations (3) and (4) and the constraint equations are over-determined, then a solution may be obtained in the sense of least squares (with transposed matrixes).

Upon determining $\rho'_1$ and $\rho'_2$, a concentration of elements generating gamma radiation essentially in the formation 4 can be determined by subtracting $\rho'_2$ from $\rho'_1$. The concentration of elements may be used to determine the elemental yields.

Correcting the main spectrum may also include incorporating borehole caliper data into a weighting factor for the background spectrum referred to above. The weighting factor at a certain borehole depth may be proportional to at least one of a diameter of the borehole 2 and the square of the diameter of the borehole 2. In general, the weighting factor uses the diameter of the borehole 2 at the depth of the borehole 2 at which the main spectrum and the background spectrum are obtained. Generally, the larger the diameter of the borehole 2, the larger the contribution the borehole materials 24 will have to the gamma ray energy spectrum derived from the radiation detected by the first gamma radiation detector 21. Correspondingly, the larger the diameter of the borehole 2, the smaller the contribution the formation 4 will have to the gamma ray energy spectrum derived from the radiation detected by the first radiation detector 21.

Generally, the well logging instrument 10 includes adaptations as may be necessary to provide for operation during drilling or after a drilling process has been undertaken.

Figure 5:
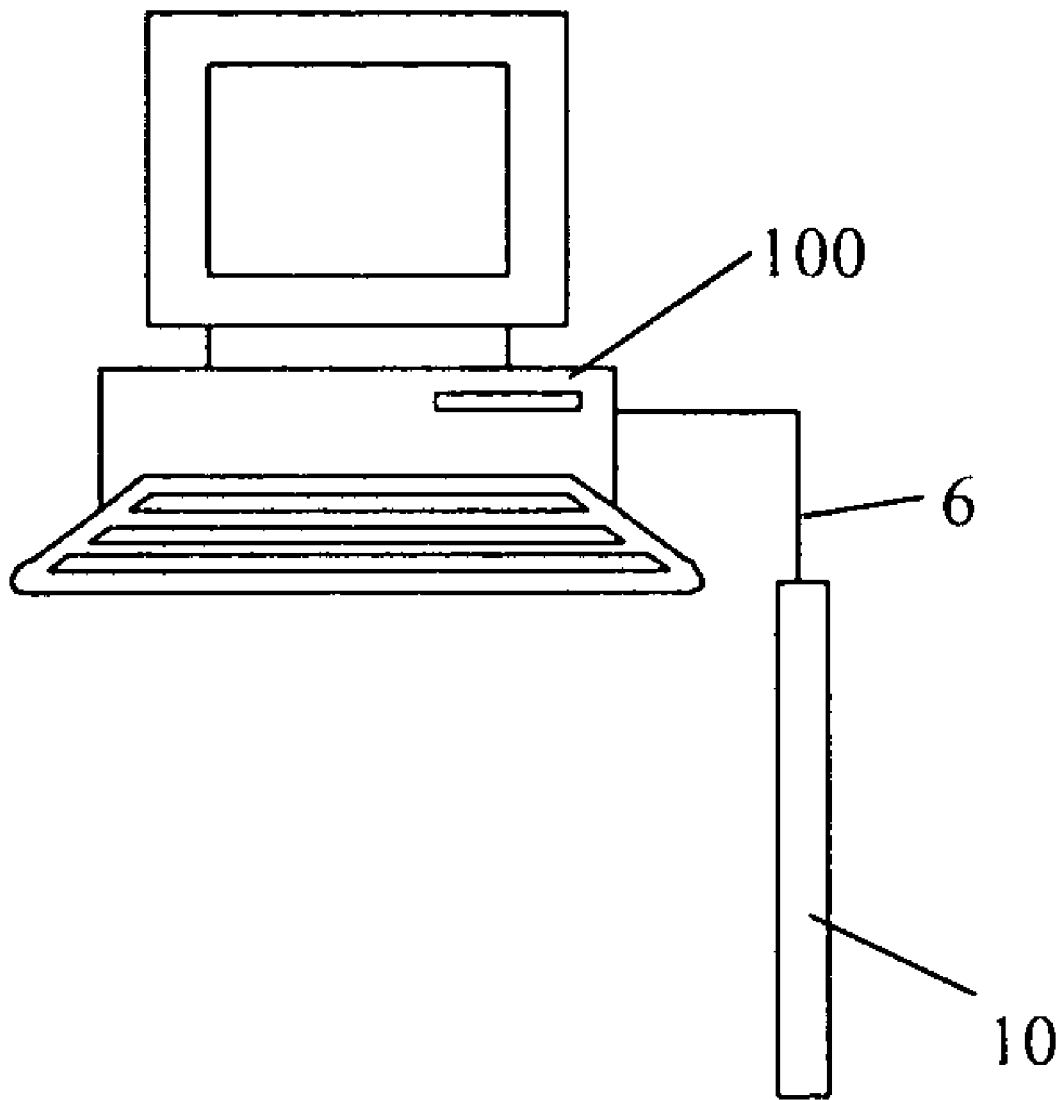
FIG. 5 illustrates an exemplary embodiment of a computer coupled to the logging instrument

Referring to FIG. 5, an apparatus for implementing the teachings herein is depicted. In FIG. 5, the apparatus includes a computer 100 coupled to the well logging instrument 10. Generally, the computer 100 includes components as necessary to provide for the real time processing of data from the well logging instrument 10. Exemplary components include, without limitation, at least one processor, storage, memory, input devices, output devices and the like. As these components are known to those skilled in the art, these are neither depicted in any detail nor discussed further herein.

Generally, the teachings herein are reduced to an algorithm that is stored on machine-readable media. The algorithm is implemented by the computer 100 and provides operators with desired output. The output is generally generated on a real-time basis.

The logging instrument 10 may be used to provide "real-time" data. As used herein, generation of data in "real-time" is taken to mean generation of data at a rate that is useful or adequate for making decisions during or concurrent with processes such as production, experimentation, verification, and other types of surveys or uses as may be opted for by a user or operator. As a non-limiting example, real-time measurements and calculations may provide users with information necessary to make desired adjustments during the drilling process. In one embodiment, adjustments are enabled on a continuous basis (at the rate of drilling), while in another embodiment, adjustments may require periodic cessation of drilling for assessment of data. Accordingly, it should be recognized that "real-time" is to be taken in context, and does not necessarily indicate the instantaneous determination of data, or make any other suggestions about the temporal frequency of data collection and determination.

A high degree of quality control over the data may be realized during implementation of the teachings herein. For example, quality control may be achieved through known techniques of iterative processing and data comparison. Accordingly, it is contemplated that additional correction factors and other aspects for real-time processing may be used. Advantageously, the user may apply a desired quality control tolerance to the data, and thus draw a balance between rapidity of determination of the data and a degree of quality in the data.

Figure 6:
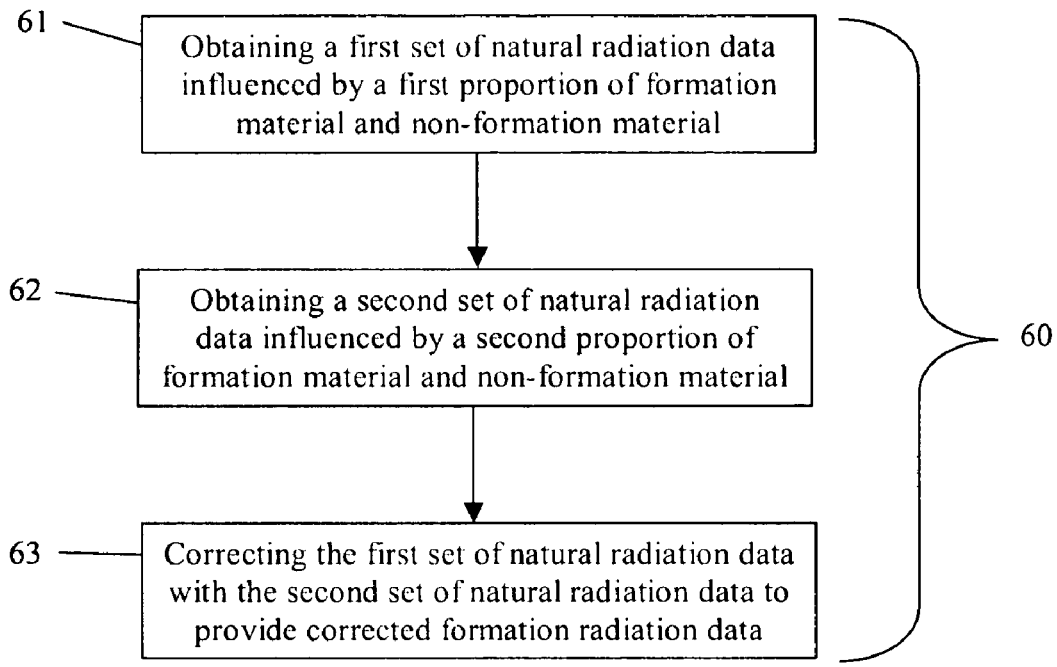
FIG. 6 illustrates an exemplary method for measuring gamma radiation along the axis of the borehole with increased spatial resolution.

FIG. 6 presents an exemplary method 60 for estimating corrected formation radiation data. A first step 61 calls for obtaining a first set of natural radiation data influenced by a first proportion of formation material and non-formation material. A second step 62 calls for obtaining a second set of natural radiation data influenced by a second proportion of the formation material and the non-formation material. A third step 63 calls for correcting the first set of natural radiation data with the second set of natural radiation data to provide corrected formation radiation data. Generally, the third step 63 includes any or a combination of the three techniques for correcting the borehole radiation data. The third step 63 may also call for incorporating the borehole caliper data into a weighting factor for the borehole radiation data. In one embodiment, the first set of natural radiation data includes contributions from the formations 4 and the borehole materials 24. In addition in this embodiment, the second set of natural radiation data is generally derived essentially from the gamma radiation emitted by the borehole materials 24.

Figure 7:
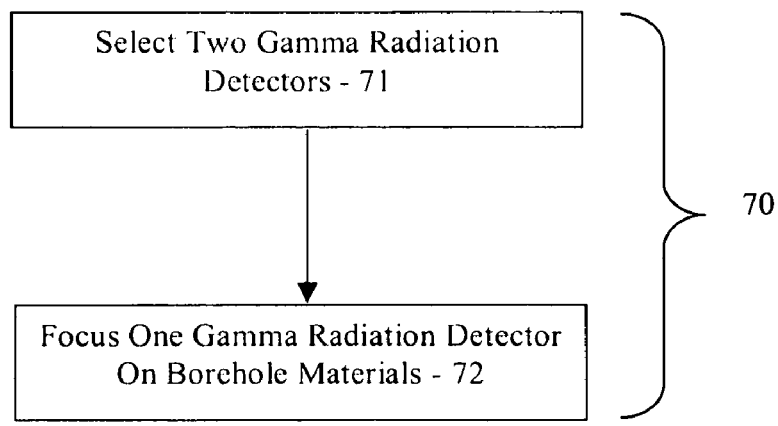
FIG. 7 presents an exemplary method for producing the logging instrument.

FIG. 7 presents an exemplary method 70 for producing the logging instrument 10. A first step 71 calls for selecting the first gamma radiation detector 21 and the second gamma radiation detector 22. A second step 72 calls for focusing one of the two gamma radiation detectors on the borehole materials 24. For example, the second gamma radiation detector 22 may be focused on the borehole materials 24 by employing the shielding 23. The shielding 23 may provide for encasing a portion of the borehole materials 24 from which the detector 22 measures gamma radiation. The shielding 23 may also shield the detector 22 from gamma radiation emitted from the formation 4. The focusing in the second step 72 may include shielding the detector 22 and positioning the detector 22 to one side of the instrument 10. The instrument 10 may be positioned eccentric to the borehole 2 to focus the detector 22 on the borehole materials 24 at the center of the borehole 2. The second step 72 may also include placing the second gamma radiation detector 22 with a placement geometry within the instrument 10 that focuses the detector 22 on the borehole materials 24.

The logging instrument 10 is suited for measuring natural gamma radiation and gamma radiation resulting from pulsed neutron spectroscopy. With the pulsed neutron spectroscopy, a borehole spectrum and a formation spectrum may be input to the joint inversion to provide the elemental yields. Alternatively, the borehole spectrum may be used to partition or correct the formation spectrum to provide the elemental yields.

The logging instrument 10 provides at least one of integral and spectral radiation data related to the formation 4 for detailed mineralogical analysis. In addition, the detailed mineralogical analysis may be performed on the drilling mud. The detailed mineralogical analysis of the drilling mud may provide a gamma radiation absorption correction. A drilling mud radiation log can support drilling mud management and control. The drilling mud radiation log can provide for a control of homogeneous drilling mud composition. The drilling mud radiation log may also detect clay-mineral separation or clay-silt separation in a mud column (for hole stability, mud cake, etc.).

In support of the teachings herein, various analysis components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a sample line, sample storage, sample chamber, sample exhaust, pump, piston, power supply (e.g., at least one of a generator, a remote supply and a battery), vacuum supply, pressure supply, refrigeration (i.e., cooling) unit or supply, heating component, motive force (such as a translational force, propulsional force or a rotational force), magnet, electromagnet, sensor, electrode, transmitter, receiver, transceiver, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims.

What is claimed is:

1. A method for estimating an elemental yield, the method comprising:
    obtaining a first set of natural radiation data influenced by a first proportion of formation material and non-formation material using a first detector;
    obtaining a second set of natural radiation data influenced by a second proportion of the formation material and the non-formation material using a second detector; and
    correcting the first set of natural radiation data with the second set of natural radiation data to provide corrected formation radiation data for estimating the elemental yield by performing a joint inversion on the first set of natural radiation data and the second set of natural radiation data wherein the joint inversion comprises solving a set of equations, the set of equations comprising a first equation having a column of counts obtained from the first detector and a second equation having a column of counts obtained from the second detector.

2. The method as in claim 1, wherein the first proportion is substantially influenced by the formation material and the second proportion is substantially influenced by the non-formation material.

3. The method as in claim 1, wherein correcting comprises subtracting a gamma ray energy spectrum derived from the second set of natural radiation data from a gamma ray energy spectrum derived from the first set of natural radiation data.

4. The method as in claim 1, wherein correcting comprises subtracting an element yield derived from the second set of natural radiation data from an element yield derived from the first set of natural radiation data.

5. The method as in claim 1, wherein correcting comprises incorporating borehole caliper data into a weighting factor for the second set of natural radiation data.

6. The method as in claim 1, wherein the first set of natural radiation data comprises a first set of counts and the second set of natural radiation data comprises a second set of counts.

7. The method as in claim 6, further comprising grouping counts according to an energy of each count in the first set of counts and the second set of counts.

8. The method as in claim 7, wherein the first set of counts and the second set of counts comprise a first group of counts having a 1.46 MeV energy level, a second group of counts having a 1.76 MeV energy level, and a third group of counts having a 2.62 MeV energy level, each group of counts not overlapping another group of counts.

9. The method as in claim 6, further comprising deriving a first energy spectrum from the first set of counts and a second energy spectrum from the second set of counts.

10. The method as in claim 9, further comprising deriving a first elemental yield from the first energy spectrum and a second elemental yield from the second energy spectrum.

11. The method as in claim 10, wherein correcting comprises performing a joint inversion on the first elemental yield and the second elemental yield.

12. The method as in claim 10, wherein correcting comprises subtracting the second elemental yield from the first elemental yield.

13. The method as in claim 1, wherein the first equation comprises contributions from a concentration of one or more elements in the elemental yield to the counts obtained from the first detector and the second equation comprises contributions from the concentration of the one or more elements in the elemental yield to the counts obtained from the second detector.

14. An instrument for estimating an elemental yield of a formation penetrated by a borehole, the instrument comprising:
- a first set of at least one radiation detector sensitive to natural radiation from a first proportion of formation material and non-formation material;
- a second set of at least one radiation detector sensitive to natural radiation from a second proportion of the formation material and the non-formation material; and
- a processor configured to estimate the elemental yield from a first set of natural radiation data obtained by the first set of at least one radiation detector and a second set of natural radiation data obtained by the second set of at least one radiation detector by performing a joint inversion on the first set of natural radiation data and the second set of natural radiation data wherein the joint inversion comprises solving a set of equations, the set of equations comprising a first equation having a column of counts obtained from the first detector and a second equation having a column of counts obtained from the second detector.

15. The instrument as in claim 14, wherein the instrument does not comprise a radiation source.

16. The instrument as in claim 14, further comprising shielding.

17. The instrument as in claim 16, wherein the shielding provides for the second proportion being different from the first proportion.

18. The instrument as in claim 16, wherein the shielding is shaped to allow at least some of the non-formation material to enter an interior of the shielding as the instrument traverses the borehole.

19. A non-transitory computer readable storage medium comprising machine-executable instructions for estimating an elemental yield by implementing a method comprising:
- obtaining a first set of natural radiation data influenced by a first proportion of formation material and non-formation material;
- obtaining a second set of natural radiation data influenced by a second proportion of the formation material and the non-formation material; and
- correcting the first set of natural radiation data with the second set of natural radiation data to provide corrected formation radiation data for estimating the elemental yield by performing a joint inversion on the first set of natural radiation data and the second set of natural radiation data wherein the joint inversion comprises solving a set of equations, the set of equations comprising a first equation having a column of counts obtained from the first detector and a second equation having a column of counts obtained from the second detector.

* * * * *